United States Patent [19]

Megumi et al.

[11] 4,097,457

[45] Jun. 27, 1978

[54] PROCESS FOR PREPARING HIGH MOLECULAR WEIGHT POLYCARBONATES

[75] Inventors: Takeaki Megumi, Sakai; Shigeo Kondo, Toyonaka, both of Japan

[73] Assignee: Mitsubishi Gas Chemical Company, Inc., Tokyo, Japan

[21] Appl. No.: 637,307

[22] Filed: Dec. 3, 1975

[30] Foreign Application Priority Data

Dec. 9, 1974 Japan ................................ 49-141319

[51] Int. Cl.² .............................................. C08G 63/62
[52] U.S. Cl. .............................. 260/47 XA; 260/47 C
[58] Field of Search .......................... 260/47 XA, 47 C

[56] References Cited

U.S. PATENT DOCUMENTS

| | | | |
|---|---|---|---|
| 3,290,409 | 12/1966 | Munro | 260/860 |
| 3,466,260 | 9/1969 | Bostian et al. | 260/47 |
| 3,475,373 | 10/1969 | Jackson, Jr. et al. | 260/47 |

Primary Examiner—Lester L. Lee
Attorney, Agent, or Firm—Brooks, Haidt, Haffner & Delahunty

[57] ABSTRACT

High molecular weight polycarbonates are prepared by the reaction of phosgene with a dihydroxydiaryl alkane in the presence of an acid acceptor, a solvent and at least one member selected from specified monohydric alcohols, haloformates, monothiols, halothioformates, monocarboxylic acids and halides, salts, quaternary ammonium salts and anhydrides thereof.

14 Claims, No Drawings

PROCESS FOR PREPARING HIGH MOLECULAR WEIGHT POLYCARBONATES

BACKGROUND OF THE INVENTION

1. Field of the Invention

This invention relates to a novel process for preparing high molecular weight polycarbonates.

2. Description of the Prior Art

There are known various processes for producing aromatic polycarbonates such as a process of reacting a dihydroxy diaryl alkane with phosgene in the presence of an acid acceptor such as an aqueous alkali, a tertiary amine and the like, and a solvent (hereinafter referred to as the "phosgene process"), a process of interesterification between a dihydroxy diaryl alkane and a di-ester of carbonic acid (hereinafter referred to as the "interesterification process") and the like.

The phosgene process can produce polycarbonates of a desired degree of polymerization ranging from a low degree of polymerization to a high degree of polymerization, but in producing an aromatic polycarbonate this process gives an extremely high solution viscosity and therefore a lot of labor and a long time are necessay for purification such as washing, neutralization and the like, and the purification can not be conducted sufficiently.

In addition, when the solvent is removed by simply heating or reducing the pressure to produce a solid resin from the resulting resin solution, the concentrated resin solution becomes paste-like resulting in difficult handling, and therefore, a complicated procedure is required, such as, for example, adding a precipitating agent to precipitate the resin and then removing the solvent and the precipitating agent remaining in the resin.

When the interesterification process is employed for producing high molecular weight polycarbonates, such various complicated procedures after the reaction step as in the phosgene process are not required, but in general, heating and melting for a long period of time are necessary so that there occur various disadvantages such as coloring, deterioration and diminution of physical properties of the resulting resin.

In addition to the above mentioned two fundamental preparation processes, there have been proposed processes where a low molecular weight polymer (prepolymer) is firstly produced and then polymerized further as disclosed in Japanese Patent Publication Sho-36-13942, Sho-37-12550 and Sho-47-14742.

Japenese Patent Publication Sho-36-13942 discloses a process for producing high molecular weight polycarbonates comprising using a phenol as a chain terminater, adding a dihydroxy diaryl alkane to a polycarbonate prepolymer obtained by a phosgene process, and heating and polycondensing them under a reduced pressure.

Japanese Patent Publication Sho-37-12550 discloses a process for preparing a high molecular weight polycarbonate which comprises removing unreacted dihydroxy diaryl alkanes from a polycarbonate prepolymer interesterification, then adding an diphenylcarbonate and an interesterification catalyst and heating and melting under vacuum.

Japanese Patent Publication Sho-47-14742 discloses a process for producing a high molecular weight polycarbonate which comprises adding a quaternary ammonium compound as a polycondensation catalyst to a polycarbonate prepolymer obtained by an interesterification and heating and melting under vacuum.

However, the melting reaction in the latter half step of each of these three is the same as the polycondensation reaction in conventional interesterification processes and the reaction mechanism is just the same as that of the interesterifying process, and therefore, a long melting time is required to produce a high molecular weight polycarbonate according to these processes, just as is required in the conventional interesterifying processes.

For example, Japanese Patent Publication Sho-36-13942 reports that the melting reaction time is as long as 5.5 hours and thereby the product becomes yellowish brown or brown.

In Japanese Patent Publication Sho-37-12550 and Sho-47-14742, it takes 2–3 hours for the latter half polycondensation and 6–7 hours for the total melting reaction to produce a high molecular weight polycarbonate.

SUMMARY OF THE INVENTION

According to the present invention, there is provided a process for preparing a high molecular weight polycarbonate comprising the reaction of phosgene with a dihydroxy diaryl alkane in the presence of an acid acceptor and a solvent, which comprises adding a monohydric phenol and at leaast one member selected from the group consisting of the compounds having the following formulas:

$$R-O-H \tag{1}$$

$$R-O-\underset{\underset{O}{\|}}{C}-X \tag{2}$$

$$R-S-H \tag{3}$$

$$R-S-\underset{\underset{O}{\|}}{C}-X \tag{4}$$

$$R'-\underset{\underset{O}{\|}}{C}-Y \tag{5}$$

$$R'-\underset{\underset{O}{\|}}{C}-O^-A^+ \tag{6}$$

$$R'-\underset{\underset{O}{\|}}{C}-O-\underset{\underset{O}{\|}}{C}-R'' \tag{7}$$

$$\underset{(M)_n}{\underset{\displaystyle\bigcirc}{}}-\underset{\underset{O}{\|}}{C}-Y \tag{8}$$

$$\underset{(M)_n}{\underset{\displaystyle\bigcirc}{}}-\underset{\underset{O}{\|}}{C}-O^-A^+ \tag{9}$$

$$\underset{(M)_n}{\underset{\displaystyle\bigcirc}{}}-\underset{\underset{O}{\|}}{C}-O-\underset{\underset{O}{\|}}{C}-\underset{(M)_{n'}}{\underset{\displaystyle\bigcirc}{}} \tag{10}$$

where
R is a hydrocarbon residue having 1–10 carbon atoms selected from the group consisting of saturated aliphatic hydrocarbon residues, aliphatic hydrocarbon residues having an aromatic group substituent and alicyclic hydrocarbon residues;
X is chloro or bromo;
R' and R'' are similar or dissimilar and are hydrocarbon residues having 1–9 carbon atoms selected from the group consisting of a saturated aliphatic hydrocarbon residues, aliphatic hydrocarbon residues having an aromatic group substituent and alicyclic hydrocarbon residues;

Y is hydroxy, chloro or bromo;

A+ is an alkali metal ion or an ammonium ion derived from a tertiary amine;

M and M' are similar or dissimilar and are selected from the group consisting of alkyl of $C_1$-$C_5$, chloro and bromo; and n and n' are similar or dissimilar and are 0, 1, 2 or 3; to produce a polycarbonate prepolymer having an intrinsic viscosity of 0.01-0.40, and heating and melting the prepolymer under a reduced pressure to cause the polycondensation.

An object of the present invention is to provide a process for preparing a high molecular weight polycarbonate free from the drawbacks of the prior art as mentioned above.

Another object of the present invention is to provide a process for preparing a transparent and colorless polycarbonate of a high molecular weight within a short time.

DESCRIPTION OF THE PREFERRED EMBODIMENTS

According to the present invention, the dihydroxy diaryl alkane and phosgene are usually reacted at a temperature of 0°-80° C, and preferably at 10°-40° C.

The dihydroxy diaryl alkane used in the present invention is a diaryl alkane having two phenolic hydroxy groups.

Representative dihydroxy diaryl alkanes used in the present invention are bis(hydroxyphenyl) alkanes and aryl alkyl hydroquinones, preferred with the bis(hydroxyphenyl) alkane having the formula

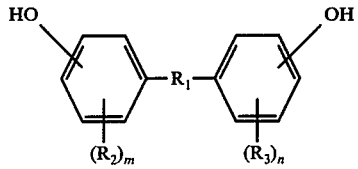

where $R_1$ is an alkylene or alkylidene of not more than 5 carbon atoms, $R_2$ and $R_3$ are similar or dissimilar and selected from the group consisting of alkyl of not more than 4 carbon atoms, phenyl, chloro and bromo, and m and n are similar or dissimilar and selected from 0, 1 and 2.

Examples of the bis(hydroxyphenyl) alkanes are:
bis(2-hydroxyphenyl) methane,
bis(4-hydroxyphenyl) methane,
1,1-bis(4'-hydroxyphenyl) ethane,
2,2-bis(4'-hydroxyphenyl) propane,
2,3-bis(2'-hydroxyphenyl) butane,
3,3-bis(4'-hydroxyphenyl) pentane,
2,2-bis(2',6'-dimethyl-4-hydroxyphenyl) propane,
2,3-bis(2'-t-butyl-4'-hydroxyphenyl) pentane,
2,2-bis(3',5'-dichloro-4'-hydroxyphenyl) propane, and
1,4-bis(2'-phenyl-4'-hydroxyphenyl) butane.

Among them, 2,2-bis(4'-hydroxyphenyl) propane is preferable because it is easily available and inexpensive.

The dihydroxy diaryl alkanes may be used alone or in combination.

The monohydric phenols used upon producing the polycarbonate prepolymer are phenol and nuclear substituted phenols, and in other words, are monofunctional compounds having one phenolic hydroxy group.

Representative monohydric phenols are:
phenol,
o-cresol,
m-cresol,
p-cresol,
2,6-xylenol,
2,4,6-trimethyl phenol,
p-t-butylphenol, and
2,4,6-tribromophenol.

Representative monohydric alcohols of Formula (1) are methanol, ethanol, n-propanol, isopropanol, n-butanol, isobutanol, t-butanol, n-hexanol, 2-hexanol, 3-hexanol, 2-ethylhexanol, chlorobutanol, cyclopentanol, cyclohexanol, and benzyl alcohol.

Representative haloformates of Formula (2) are methyl chloroformate, ethyl chloroformate, isopropyl chloroformate, 2-ethylhexyl chloroformate and methyl bromoformate.

Representative monothiols of Formula (3) are methyl mercaptan, ethyl mercaptan, benzyl mercaptan, and cyclohexyl mercaptan.

Representative halothioformates of Formula (4) are methyl chlorothioformate, ethyl chlorothioformate, benzylchlorothioformate, and cyclohexyl chlorothioformate.

Representative monocarboxylic acids of Formula (5) where Y is hydroxy are acetic acid, propionic acid, n-butyric acid, isobutyric acid, n-octylic acid, iso-octylic acid, cyclohexane carboxylic acid, phenylacetic acid, and hydrocinnamic acid.

Representative monocarboxylic acids of Formula (8) where Y is hydroxy are benzoic acid, o-toluic acid, and p-toluic acid.

Representative monocarboxylic acid halides of Formula (5) where Y is chloro or bromo are acetyl chloride and propionyl chloride.

A representative monocarboxylic acid halide of Formula (8) where Y is chloro or bromo is benzoyl chloride.

Representative monocarboxylic acid salts of Formula (6) are sodium acetate and pyridine acetate.

Representative monocarboxylic acid salts of Formula (9) are sodium benzoate and pyridine benzoate.

Representative monocarboxylic acid anhydrides of Formula (7) are acetic anhydride, n-butyric anhydride, isobutyric anhydride and phenylacetic anhydride.

Representative monocarboxylic acid anhydrides of Formula (10) is benzoic anhydride.

The compounds of Formulas (1) and (2) are most preferable and inexpensive and the rate of reaction is very rapid. The compounds of Formula (3) and (4) give a rate of reaction similar to that of compounds of Formulas (1) and (2), but they have somewhat undesirable odors. The compounds of Formulas (5), (6) and (7) attach to the polymer ends more strongly than compounds (1) and (2) and therefore, the reactivity is lower than that of compounds (1) and (2). The compounds (8), (9) and (10) are less volatile than compounds (5), (6) and (7) and therefore, the rate of reaction thereof is lower than that of compounds (5), (6) and (7).

When the number of carbon atom in R, R' and R" is higher than the upper limit, the volatility of products derived from the polymer ends of the prepolymer upon melting polycondensation is so low that the rate of reaction is disadvantageously slow.

According to the present invention, the amount of the monohydric phenol added upon preparing the polycarbonate prepolymer may be added in an optional amount, but when a large amount of the monohydric phenol is used, the rate of reaction at the latter half of the melting polycondensation reaction is lowered to a great extent so that a preferable amount of the monohydric phenol is 0.1–5 mole % and it is more preferred with 1–4 mole % based on the dihydroxy diaryl alkane.

The compounds represented by Formulas (1)–(10) added together with the monohydric phenol may be also used in an optional amount. Preferably the amount of said compound is 0.5–100 mole % based on the dihydroxy diaryl alkane, and more preferably said compound is in an amount of 0.5–40 mole % based on the dihydroxy diaryl alkane.

When the compound of Formulas (1)–(10) is used in an amount of more than 100 mole %, upon producing the polycarbonate prepolymer the compound of Formulas (1)–(10) reacts with phosgene to form a large amount of by-products such as low boiling dialkyl carbonates, dialkyl thiocarbonates and the like. Thus, an excess amount of phosgene is consumed and further upon the melting polycondensation reaction, a large amount of low boiling materials are contained in the prepolymer and therefore, the degree of vacuum is disadvantageously lowered.

On the contrary, when the amount of each of the compounds represented by Formula (1)–(10) is less than 0.5 mole % based on the dihydroxy diaryl alkane, the melting polycondensation reaction is not effectively accelerated since sufficient residues of these compounds available to the polymer ends of the polycarbonate prepolymer.

The molar ratio of a compound of Formulas (1)–(10) to the monohydric phenol ranges from 1000:1 to 0.1:1, preferably from 50:1 to 0.3:1, more preferably from 10:1 to 0.3:1.

As an acid acceptor, there may be used a 5–10% (by weight) aqueous alkali solution such as aqueous sodium hydroxide, potassium hydroxide and calcium hydroxide, or a tertiary amine such as pyridine.

As the solvent, there may be used an organic solvent, provided that it is insoluble or difficultly soluble in water and does not react with phosgene. It is preferable that the organic solvent can dissolve the dihydroxy diaryl alkane, monohydric phenol, compound of Formula (1)–(10) and the resulting polycarbonate prepolymer to some extent. Such preferable solvents are, for example, methylene chloride, chloroform, carbon tetrachloride, tetrachloroethane, chlorobenzene, and xylene.

Phosgene may be added to the reaction system of one of various ways such as blowing a gaseous phosgene into a mixture of dihydroxy diaryl alkane, an acid acceptor, chain terminator, and solvent; adding a phosgene dissolved in a solvent to the mixture; and the like.

The monohydric phenol and the compound of Formula (1)–(10) may be added to the reaction system at any time before, during and after the reaction with phosgene.

However, the monocarboxylic acid and the monocarboxylic acid salt in Formula (5)–(10) are preferably added before or during the reaction with phosgene. If they are added after the reaction is completed, the monocarboxylic acid residue can not be sufficiently attached to the polymer ends of polycarbonate prepolymer and therefore, the melting polycondensation reaction is not sufficiently accelerated in some cases.

When a tertiary amine is used as an acid acceptor, it is preferable to add the monohydric phenol and the compound of Formula (1)–(10) before the reaction or during the first half period of the reaction with phosgene so as to cause effectively the reaction of the added starting materials.

The degree of polymerization of the polycarbonate prepolymer may be adjusted by controlling types of the monohydric phenol and the compound of Formula (1)–(10), combination thereof, amounts thereof and the reaction condition appropriately. Preferably the intrinsic viscosity is 0.01–0.40, more preferably, 0.05–0.40.

When the intrinsic viscosity of polycarbonate prepolymer is higher than 0.40, it is difficult to conduct a purification of a solution of the polycarbonate prepolymer such as washing and neutralization and remove the solvent. On the contrary, when the intrinsic viscosity is lower than 0.01, the polycarbonate prepolymer vaporizes to a great extent in the melting polycondensation reaction and therefore, such range of the intrinsic viscosity is not preferable.

The resulting solution of the polycarbonate prepolymer may be purified by washing and neutralizing, and then concentrated or dried to give a polycarbonate prepolymer in a form of jelly, paste, block, crystal, powder or particle, and the resulting matter may be heated to effect the melting polycondensation under a reduced pressure and, if desired, 0.00005–0.1% by weight of a polycondensation catalyst.

As the polycondensation catalyst, there may be mentioned preferably a basic compound such as oxides, hydroxides, carboxylic acid salts, alcoholates, phenolates, and hydrides of an alkali metal and an alkaline earth metal.

The melting polycondensation reaction may be effected at 220°–320° C and under a reduced pressure, that is, preferably at not higher than 40 Torr. at the beginning of the reaction and at not higher than 10 Torr., and preferably not higher than 1 Torr., towards the end of the reaction.

If necessary, the reaction vessel may be flushed with nitrogen gas and the reaction may be carried out in a nitrogen atmosphere and the reaction mixture may be stirred.

When the polycondensation proceeds up to a certain degree of polymerization, a neutralizer may be added to deactivate the polycondensation catalyst, and a stabilizer, a dye, a pigment, a filler or an ultraviolet ray absorber may be incorporated therein.

After the completion of the melting polycondensation, the resulting molten resin is usually extruded to a strand or plate form and then cut to produce pellets.

Hereinafter there is shown an excellent effect of the present invention, i.e. acceleration of a melting polycondensation. The polycarbonate prepolymer having residues of the chain terminater according to the present invention at the polymer ends can be converted to a high polymer in a very short time in the polycondensation reaction.

Table 1 below shows a result of comparison experiments from which the excellent acceleration of the melting polycondensation reaction is clear according to the present invention.

As a polycondensation reaction catalyst, 0.0010% by weight of potassium benzoate was added to each of the polycarbonate prepolymers No. 1–No. 8 below heated and melted in a glass tube at 1.0 Torr. at 300° C for 60 minutes and the difference between the intrinsic viscosity before the melting polycondensation and that after the melting polycondensation, which corresponds to the rate of reaction is compared with each other.

No. 1: Bisphenol A polycarbonate prepolymer where 7.5 mole %, based on bisphenol A, of phenol is used as a chain terminator No. 2: Bisphenol A polycarbonate prepolymer where 7.5 mole %, based on bisphenol A, of p-t-butylphenol is used.

No. 3: Bisphenol A polycarbonate prepolymer where 3 mole %, based on bisphenol A, of phenol and 3 mole %, based on bisphenol A, of methyl chloroformate are used.

No. 4: Bisphenol A polycarbonate prepolymer where 3 mole %, based on bisphenol A, of p-t-butylphenol and 3 mole %, based on bisphenol A, of methanol are used.

No. 5: Bisphenol A polycarbonate prepolymer where 3 mole %, based on bisphenol A, of p-t-butylphenol and 3 mole %, based on bisphenol A, of isopropyl chloroformate are used.

No. 6: Bisphenol A polycarbonate prepolymer where 3 mole %, based on bisphenol A, of p-t-butylphenol and 3 mole %, based on bisphenol A, of methylmercaptan are used.

Np. 7: Bisphenol A polycarbonate prepolymer where 3 mole %, based on bisphenol A, of p-t-butylphenol and 3 mole %, based on bisphenol A, propionyl chloride are used.

No. 8: Bisphenol A polycarbonate prepolymer where 3 mole %, based on bisphenol A, of p-t-butylphenol, 1 mole %, based on bisphenol A, of methanol, 1 mole %, based on bisphenol A, of methyl mercaptan and 1 mole %, based on bisphenol A, of acetyl chloride are used.

cosity of each No. 3-No. 8 far exceeds the above mentioned critical value, 0.45, in one hour. On the contrary, in cases of No. 1 and No. 2 (Comparison Examples) the rate of reaction of the polycarbonate prepolymer is so low that a further long heating and melting is necessary to attain the critical value, 0.45. This indicates clearly the remarkable acceleration of the melting polycondensation reaction caused by the residue of the chain terminator attached to the polymer end of polycarbonate prepolymer according to the present invention.

The process of the present invention uses a polycarbonate prepolymer as an intermediate so that the purification procedure such as washing and neutralizing is very easy, and furthermore, since the solid matter containing only a little amount of a remaining solvent can be obtained only by evaporating off the solvent and further, the resulting solid matter can be easily ground. Therefore, the solid matter can be simply produced and the productivity increases and the manufacturing apparatus can be rationalized.

Furthermore, the melting time can be shortened to a great extent as compared with conventional interesterification processes and the above mentioned improved interesterification processes, and thereby coloring and deterioration of the resulting resin can be prevented.

According to the process of the present invention, there are easily obtained high molecular weight polycarbonates of excellent color and of the same physical properties as high molecular weight polycarbonates produced by the conventional phosgene process and interesterification process, within a short time. Therefore, the process of the present invention is very useful for a commercial and continuous production of high molecular weight polycarbonates having an intrinsic Table I

| | No. | Chain terminator used for preparation of prepolymer Kind | Amount (Mol % based on bisphenol A) | Result of melting polycondensation Intrinsic viscosity [η] (a)* (b)** | Rate of reaction Δ[η]/hr. | Example No. |
|---|---|---|---|---|---|---|
| Comparison example | 1 | Phenol | 7.5 | (a) 0.278 (b) 0.308 | 0.030 | Comparison example 1 |
| | 2 | p-t-butylphenol | 7.5 | (a) 0.305 (b) 0.322 | 0.017 | Comparison example 2 |
| The present invention | 3 | Phenol Methylchloroformate | 3 3 | (a) 0.371 (b) 1.006 | 0.635 | Example 1 |
| | 4 | p-t-butylphenol Methanol | 3 3 | (a) 0.382 (b) 0.967 | 0.585 | Example 8 |
| | 5 | p-t-butylphenol Isopropylchloroformate | 3 3 | (a) 0.353 (b) 0.648 | 0.295 | Example 11 |
| | 6 | p-t-butylphenol Methylmercaptan | 3 3 | (a) 0.362 (b) 0.679 | 0.317 | Example 12 |
| | 7 | p-t-butylphenol Propionylchloride | 3 3 | (a) 0.383 (b) 0.535 | 0.152 | Example 16 |
| | 8 | p-t-butylphenol Methanol Methylmercaptan Acetylchloride | 3 1 1 1 | (a) 0.344 (b) 0.730 | 0.386 | Example 19 |

*(a) : Before the reaction (Polycarbonate prepolymer)
**(b) : After the reaction (Product obtained by the melting polycondensation reaction)

It is well known that aromatic polycarbonate resins have excellent heat resistance and impact strength when the intrinsic viscosity is not lower than 0.45 (the average molecular weight being 19,500) while the physical properties are lowered to a great extent when the intrinsic viscosity is lower than 0.45.

As is clear from Table 1 above, the intrinsic viscosity of the polycarbonate prepolymer, having residues of the chain terminator at the polymer ends according to the present invention, increases abruptly by heat melting under a reduced pressure and thereby the intrinsic viscosity of not lower than 0.45.

The intrinsic viscosity of polycarbonates used in this specification is calculated by the following formula:

$$\text{intrinsic viscosity } [\eta] = \lim_{c \to o} \eta_{sp}/c$$

where $\eta_{sp}$ is a specific viscosity of a solution of a polycarbonate in methylene chloride determined at 25° C by using an Ostwald's viscosimeter and "c" is the amount (g.) of the polymer in 100 ml. of the solution.

The following examples are given for illustrating the present invention in more detail.

EXAMPLE 1

To a solution of 43.2 g. (1.08 m.) in 530 ml. of distilled water were subsequently added 250 ml. of methylene chloride, 1.13 g. (0.012 m.) of phenol, and 91.2 g. (0.4 m.) of bisphenol A, i.e. 2,2-bis(4'-hydroxyphenyl)propane; the resulting mixture was kept at 20° C; and 39.0 g. (0.394 m.) of phosgene was bubbled through the mixture with stirring over 55 minutes. Immediately after the completion of bubbling the phosgene, 1.13 g. (0.012 m.) of methyl chloroformate dissolved in 25 ml. of methylene chloride was added to the mixture at one time and then 4.0 g. (0.04 m.) of phosgene was bubbled through it over 5 minutes. After the completion of bubbling phosgene, 0.1 g. of triethylamine was added followed by vigorous stirring for 90 minutes.

The methylene chloride layer was separated, and phosphoric acid was used for the neutralization and then water washing was repeated.

After distilling off the methylene chloride, the remaining matter was dried at 70° C under vacuum for one night to obtain a polycarbonate prepolymer having a phenol residue and a methyl chloroformate residue. Its intrinsic viscosity was 0.371 and it could be easily ground.

The resulting powders of the polycarbonate prepolymer were placed in a glass test tube and melted at 1.0 Torr. at 300° C for one hour to give a colorless and transparent product having an intrinsic viscosity of 0.468.

To the above mentioned powders of the polycarbonate prepolymer was added 0.0010% by weight of potassium benzoate as a polycondensation reaction catalyst and the resulting mixture was melted under the same reduced pressure for 30 minutes and one hour, respectively.

Each of the resulting resins was a strong and transparent resin, and the intrinsic viscosities thereof were 0.722 (average molecular weight = 34,500) and 1.006 (average molecular weight = 51,800), respectively. Their APHA were 20 and 25, respectively.

COMPARISON EXAMPLE 1

Repeating the procedure of Example 1 except that 2.82 g. (0.03 moles) of phenol was used and methyl chloroformate was not added, there was obtained a polycarbonate prepolymer having an intrinsic viscosity of 0.278.

The resulting powders of the polycarbonate prepolymer alone were melted at 1.0 Torr. at 300° C for one hour to obtain an intrinsic viscosity of 0.285. When the powders of the polycarbonate prepolymer were melted together with 0.0010% by weight of potassium benzoate for one hour to result in an intrinsic viscosity of 0.308.

When the powders of the polycarbonate prepolymer were melted together with 0.010% by weight of potassium benzoate for 30 minutes or one hour. In both cases the resulting product was light yellow. The product after melting for 30 minutes had an intrinsic viscosity of 0.442. The product after melting for one hour contained a lot of matter insoluble in methylene chloride and the intrinsic viscosity could not be measured.

EXAMPLES 2-7

Repeating the procedure of Example 1 except that the type of chloroformate and/or its amount is different from those in Example 1, there were obtained powders of a polycarbonate prepolymer, which were then melted together with 0.0010% by weight of potassium benzoate in a glass test tube at 1.0 Torr. at 300° C for 1 hour. The results are shown in Table 2 below.

Table 2

| | Chloroformate | | Intrinsic viscosity ($\eta$) | |
|---|---|---|---|---|
| Example | Type | Amount (Mole % based on bisphenol A) | Before the reaction (Polycarbonate prepolymer) | After the reaction (Product obtained by the melting polycondensation reaction) |
| 2 | Methyl chloroformate | 5.0 | 0.291 | 0.928 |
| 3 | Methyl chloroformate | 8.0 | 0.247 | 0.792 |
| 4 | Methyl chloroformate | 15.0 | 0.156 | 0.536 |
| 5 | Ethyl chloroformate | 3.0 | 0.344 | 0.751 |
| 6 | Isopropyl chloroformate | 3.0 | 0.322 | 0.657 |
| 7 | Cyclohexyl chloroformate | 3.0 | 0.372 | 0.614 |

EXAMPLE 8

To a four-necked separable flask fitted with a thermometer, a stirrer, and a phosgene inlet, were added 114 g. (0.5 m.) of bisphenol A, 2.25 g. (0.015 m.) of p-t-butylphenol, 0.48 g. (0.015 m.) of methanol; 125 g. (1.58 m.) of dry pyridine and 500 ml. of dry methylene chloride, and 50 g. (0.505 m.) of phosgene was bubbled through the resulting mixture at 23° C over 80 minutes.

300 ml. of dry methylene chloride was further added and then 4 g. (0.04 m.) of phosgene dissolved in 40 ml. of dry methylene chloride was added dropwise over 10 minutes.

The resulting mixture was stirred for a further 90 minutes and then the resulting yellow mixture in the flask was poured into 700 ml. of a 10% aqueous HCl and stirred vigorously.

The methylene chloride layer was separated, washed with 750 ml. of a distilled water three times, neutralized with 500 ml. of a 0.5% aqueous sodium hydroxide with an ice cooling for 5 minutes, washed with water twice, and then 5 ml. of a concentrated phosphoric acid was added thereto followed by a vigorous stirring for 30 minutes. The resulting solution was repeatedly washed with water and then methylene chloride was distilled off to obtain a polycarbonate prepolymer having a p-t-butylphenol residue and a methanol residue at the polymer ends.

Intrinsic viscosity of the polycarbonate thus obtained was 0.382. The polycarbonate was melted at 300° C at 1 Torr. for one hour to give an intrinsic viscosity of 0.461.

To the powders of the polycarbonate prepolymer was added 0.0010% by weight of potassium benzoate and melted for 30 minutes and one hour, respectively. Intrinsic viscoscities of the resulting products were 0.698 and 0.967, respectively, and their APHA were 15 and 20, respectively.

When the polycarbonate prepolymer was mixed with 0.0050% by weight of disodium salt of bisphenol A and melted for 15 minutes, there was obtained a slightly yellow transparent resin, which had an intrinsic viscosity of 0.743.

COMPARISON EXAMPLE 2

Repeating the procedure of Example 8 except that 5.62 g. (0.0375 m.) of p-t-butylphenol was used and methanol was not added, there was obtained a polycarbonate prepolymer having an intrinsic viscosity of 0.305.

To the powders of the aromatic polycarbonate was added 0.0010% by weight of potassium benzoate and melted for 30 minutes and one hour as in Example 8. The resulting intrinsic viscosities were 0.316 and 0.323, respectively.

EXAMPLES 9–18

Repeating the procedure of Example 8 except that, in place of methanol, there was used 3 mole %, based on bisphenol A, of cyclohexanol, benzyl alcohol, isopropyl chloroformate, methyl mercaptan, benzyl chlorothioformate, acetic acid, pyridine acetate, propionyl chloride, benzoyl chloride or acetic anhydride, there was obtained each polycarbonate prepolymer in the a form of powder, to which 0.0010% by weight of potassium benzoate was added. The resulting mixture was placed in a glass test tube, and melted at 1.00 Torr. at 300° C for 1 hour. The results are shown in Table 3.

Table 3

| | Chain terminator | | Intrinsic viscosity ($\eta$) | |
|---|---|---|---|---|
| Example | Type | Amount (g.) | Before the reaction (Polycarbonate prepolymer) | After the reaction (Product obtained by the melting polycondensation reaction) |
| 9 | Cyclohexanol | 1.50 | 0.336 | 0.724 |
| 10 | Benzyl alcohol | 1.63 | 0.372 | 0.697 |
| 11 | Isopropyl chloroformate | 1.84 | 0.353 | 0.648 |
| 12 | Methyl mercaptan | 0.72 | 0.362 | 0.679 |
| 13 | Benzyl chlorothioformate | 2.59 | 0.405 | 0.653 |
| 14 | Acetic acid | 0.90 | 0.387 | 0.641 |
| 15 | Pyridine acetate | 2.08 | 0.398 | 0.723 |
| 16 | Propionyl chloride | 1.36 | 0.383 | 0.535 |
| 17 | Benzoyl chloride | 2.11 | 0.354 | 0.476 |
| 18 | Acetic anhydride | 1.53 | 0.370 | 0.602 |

EXAMPLE 19

Repeating the procedure of Example 8 except that a mixture of 0.16 g. (0.005 m.) of methanol and 0.24 g. (0.005 m.) of methyl mercaptan was used in place of 0.48 g. (0.015 m.) of methanol; there was bubbled 15 g. (0.15 m.) of phosgene; and then 0.39 g. (0.005 m.) of acetyl chloride dissolved in 20 ml. of dry methylene chloride was added to produce polycarbonate prepolymers having methanol residues, methyl mercaptan residues and acetic acid residues in addition to p-t-butylphenol residues at the polymer ends.

Intrinsic viscosity of the resulting product was 0.344. When 0.0010% by weight of potassium benzoate was added and melting was effected for one hour at a reduced pressure as in Example 8, the intrinsic viscosity value increased up to 0.730.

EXAMPLE 20

To 55 g. (1.37 m.) of sodium hydroxide dissolved in 660 ml. of a distilled water were subsequently added 300 ml. of methylene chloride, 2.25 g. (0.015 m.) of p-t-butylphenol, and 114 g. (0.5 m.) of bisphenol A, and kept at 20° C, and 52 g. (0.525 m.) of phosgene was bubbled through the resulting solution over 50 minutes.

Immediately after the completion of the bubbling phosgene, 0.48 g. (0.015 m.) of methanol diluted with 20 ml. of methylene chloride was added and stirred for 90 minutes.

The methylene chloride layer was separated, neutralized with phosphoric acid, and repeatedly washed with water; and methylene chloride was distilled off; and the residue was dried over-night at 70° C under vacuum. Intrinsic viscosity of the resulting polycarbonate prepolymer was 0.351. After adding 0.0010% by weight of potassium benzoate, the resulting mixture was melted at 300° C at 1.0 Torr. for 30 minutes and for one hour, and the intrinsic viscosities increased to 0.627 and 0.841, respectively.

EXAMPLE 21

Repeating the procedure of Example 20, except that 3.2 g. (0.1 m.) of methanol was added before bubbling the phosgene, in place of adding 0.48 g. (0.015 m.) of methanol after bubbling the phosgene, the resulting polycarbonate prepolymer was subjected to the reaction procedure as in Example 20. The result is shown in Table 4.

EXAMPLE 22

Repeating the procedure of Example 20, except that 0.72 g. (0.015 m.) of methyl mercaptan was added 15 minutes after the beginning of bubbling the phosgene, in place of adding 0.48 g. (0.015 m.) of methanol after the beginning of bubbling the phosgene, the result is shown in Table 4.

EXAMPLE 23

Repeating the procedure of Example 20, except that 0.70 g. (0.005 m.) of benzoyl chloride was added in place of adding 0.48 g. (0.015 m.) of methanol, the result is shown in Table 4.

Table 4

| | Example | 21 | 22 | 23 |
|---|---|---|---|---|
| Monohydric phenols | Type | p-t-butylphenol | p-t-butylphenol | p-t-butylphenol |
| | Mole % based on bisphenol A | 3 | 3 | 3 |
| Chain terminator | Type | Methanol | Methyl mercaptan | Benzoyl chloride |
| | Time of addition | Before bubbling phosgene | At 15 minutes after the beginning of bubbling phosgene | After bubbling phosgene |
| | Mole % based on bisphenol A | 20 | 3 | 1 |
| Intrinsic viscosity ($\eta$) | Before the reaction (Polycarbonate prepolymer) | 0.098 | 0.382 | 0.415 |
| | After the reaction (Product of the melting polycondensation reaction) After melting for 30 minutes | 0.264 | 0.549 | 0.522 |
| | After melting for one hour | 0.450 | 0.716 | 0.593 |

EXAMPLE 24

To 55 g. (1.37 m.) of sodium hydroxide dissolved in 660 ml. of distilled water were added 300 ml. of methylene chloride, 2.25 g. (0.015 m.) of p-t-butylphenol, 114 g. (0.5 m.) of bisphenol A; the resulting mixture was kept at 20° C; and phosgene was bubbled through with stirring. When 15 g. (0.151 m.) of phosgene had been bubbled through, there was added 1.39 g. (0.015 m.) of propionyl chloride dissolved in 20 ml. of methylene chloride.

The total amount of bubbled phosgene was 52 g. (0.525 m.). After completion of the phosgene bubbling, 0.48 g. (0.015 m.) of methanol diluted with 20 ml. of methylene chloride was added and then stirred for further 90 minutes. Thus, there were obtained polycarbonates having p-t-butylphenol residues, methanol residues and propionyl residues at the polymer ends and having an intrinsic viscosity of 0.220.

To the powders of the polycarbonate prepolymer was added 0.0005% by weight of sodium acetate and melted at 0.1 Torr. at 300° C for 15 minutes, 30 minutes and one hour, respectively. The resulting products are colorless and transparent and their intrinsic viscosities were 0.337, 0.402 and 0.648, respectively.

EXAMPLE 25

Repeating the procedure of Example 8, except that 0.80 g. (0.025 m.) of methanol was used in place of 0.48 g. of methanol, there was produced polycarbonate prepolymers having an intrinsic viscosity of 0.286.

The resulting polycarbonate powder (90 g.) was mixed with 1.2 mg. (0.0013% by weight based on the polycarbonate) of potassium benzoate, heated and melted in a 300 ml. stainless steel reaction vessel fitted with a stirrer, vacuum outlet, and a heater, at 290° C. at 1.0–1.5 Torr. for 30 minutes and one hour respectively.

The resulting reaction products were transparent and strong, and almost colorless.

The product was heat-rolled at 270° C to a film of 0.2 mm. in thickness, and sample pieces were taken therefrom to measure the tensile strength and elongation.

Further, the product was pressed to a plate of 3 mm. in thickness, and some samples were measured to determine the heat distortion.

It was not possible to make the polycarbonate prepolymer into a film or a press-shaped plate.

The results of measuring the physical properties are compared with those obtained by a conventional phosgene process in Table 5 below.

Table 5

| | Sample | Intrinsic viscosity ($\eta$) | Elongation (%) | Stress at brake (Kg/cm$^2$) | Yield stress (Kg/cm$^2$) | Heat distortion temperature (Load:264 psi.) (° C) |
|---|---|---|---|---|---|---|
| The present invention | Melted for 30 min. | 0.458 | 106 | 574 | 593 | 133.5 |
| | Melted for one hour | 0.574 | 116 | 637 | 591 | 135.2 |
| Comparison Example | Polycarbonate produced by conventional phosgene process | 0.506 | 118 | 659 | 593 | 134.5 |

EXAMPLE 26

Repeating the procedure of Example 15, except that 3.0 g. (3 mole %) of pyridine benzoate was used in place of pyridine acetate, the intrinsic viscosities before the reaction and after the reaction were 0.403 and 0.636, respectively.

EXAMPLE 27

Repeating the procedure of Example 18 except that 3.39 g. of benzoic anhydride was used in place of acetic anhydride, the intrinsic viscosity before the reaction and that after the reaction were 0.384 and 0.551, respectively.

EXAMPLE 28

To a solution of 43.2 g. (1.08 m.) in 530 ml. of a distilled water were subsequently added 250 ml. of methylene chloride, 1.13 g. (0.012 m.) of phenol, 1.23 g. (0.012 m.) of sodium acetate, and 91.2 g. (0.4 m.) of bisphenol A, i.e., 2,2-bis(4'-hydroxyphenyl)propane; the resulting mixture was kept at 20° C; and 39.0 g. (0.394 m.) of phosgene was bubbled through the mixture with stirring over 55 minutes.

After the completion of bubbling phosgene, 0.1 g. of triethylamine was added followed by vigorous stirring for 90 minutes.

After the above procedure, the same procedure as in Example 1 was repeated and a similar result was obtained.

We claim:

1. A process for preparing a high molecular weight polycarbonate comprising
   (A) reacting phosgene with a dihydroxydiarylalkane at a temperature of from 0° to 80° C in the presence of an acid acceptor and a solvent by adding a monohydric phenol and at least one member selected from the group consisting of compounds having the formulas

where R is a hydrocarbon residue having 1 to 10 carbon atoms selected from the group consisting of saturated aliphatic hydrocarbon residues, aliphatic hydrocarbon residues having an aromatic group substituent and alicyclic hydrocarbon residues; X is chloro or bromo; the quantity of monohydric phenol is from 0.1 to 5 mole percent, based on the dihydroxydiarylalkane; and the amount of compound according to Formulas (1) and (2) is from 0.5 to 100 mole percent, based on the dihydroxydiarylalkane, to produce a polycarbonate prepolymer having the chains terminated with residues of compounds (1) and/or (2) and an intrinsic viscosity of 0.01 to 0.40, determined with an Ostwald viscosimeter in methylene chloride at 25° C, and
   (B) heating and melting under reduced pressure the prepolymer so formed to cause polycondensation thereof at a temperature of 220° to 320° C.

2. A process according to claim 1 in which X is chloro.

3. A process according to claim 1 in which R is a saturated aliphatic hydrocarbon residue having 1 – 10 carbon atoms.

4. A process according to claim 1 in which R is a saturated aliphatic hydrocarbon residue having 1 – 4 carbon atoms.

5. A process according to claim 1 in which the monohydric phenol is phenol or a nuclear substituted monofunctional phenol having one phenolic hydroxy group.

6. A process according to claim 1 in which the amount of the monohydric phenol is 1 – 4 mole % based on the dihydroxy diaryl alkane.

7. A process according to claim 1 in which the amount of compound having the formulas (1) – (2) is 0.5 – 40 mole % based on the dihydroxy diaryl alkane.

8. A process according to claim 1 in which the molar ratio of the compound having the formulas (1) – (2) to the monohydric phenol is in a range of from 0.1:1 to 1000:1.

9. A process according to claim 8 in which the molar ratio of the compound of the formulas (1) – (2) to the monohydric phenol is in the range of from 0.3:1 to 50:1.

10. A process according to claim 8 in which the molar ratio of the compound of the formulas (1) – (2) to the monohydric phenol is in the range of from 0.3:1 to 10:1.

11. A process according to claim 1 in which the intrinsic viscosity of the polycarbonate prepolymer ranges from 0.05 to 0.40.

12. A process according to claim 1 in which the polycondensation reaction is effected at 220° – 320° C at a pressure not higher than 40 Torr. at the beginning and at a pressure not higher than 10 towards end of the polycondensation reaction.

13. A process according to claim 1 in which the dihydroxy diaryl alkane is selected from the class of bis(2-hydroxyphenyl)methane, bis(4-hydroxyphenyl)methane, 1,1-bis(4'-hydroxyphenyl)ethane, 2,2-bis(4'-hydroxyphenyl)propane, 2,3-bis(2'-hydroxyphenyl)butane, 3,3-bis(4'-hydroxyphenyl)pentane, 2,2-bis(2',6'-dimethyl-(4-hydroxyphenyl)propane, 2,3-bis(2'-t-butyl-4'-hydroxyphenyl)pentane, 2,2-bis(3',5'-dichloro-4'-hydroxyphenyl)propane, and 1,4-bis(2'-phenyl-4'-hydroxyphenyl)butane.

14. A process according to claim 13 in which the dihydroxy diaryl alkane is 2,2-bis(4'-hydroxyphenyl)propane.

* * * * *

UNITED STATES PATENT AND TRADEMARK OFFICE
CERTIFICATE OF CORRECTION

PATENT NO. : 4,097,457
DATED : June 27, 1978
INVENTOR(S) : TAKEAKI MEGUMI ET AL

It is certified that error appears in the above-identified patent and that said Letters Patent are hereby corrected as shown below:

Column 1, line 24, correct spelling of "necessary".

Column 8, line 1, after "each" insert --of--.

Column 15, line 17, insert -- R-O-H        (1) -- after "formulas".

Signed and Sealed this

Fifteenth Day of May 1979

[SEAL]

Attest:

RUTH C. MASON
Attesting Officer

DONALD W. BANNER
Commissioner of Patents and Trademarks